United States Patent
Morikawa et al.

(10) Patent No.: US 6,350,530 B1
(45) Date of Patent: Feb. 26, 2002

(54) BIODEGRADABLE CARD BASE

(75) Inventors: Akira Morikawa; Mamoru Oishi; Yoshikiyo Saito, all of Moriyama (JP)

(73) Assignee: Gunze Limited (JP)

( * ) Notice: Subject to any disclaimer, the term of this patent is extended or adjusted under 35 U.S.C. 154(b) by 0 days.

(21) Appl. No.: 09/155,407

(22) PCT Filed: Mar. 24, 1997

(86) PCT No.: PCT/JP97/00980

§ 371 Date: Jan. 4, 1999

§ 102(e) Date: Jan. 4, 1999

(87) PCT Pub. No.: WO97/35922

PCT Pub. Date: Oct. 2, 1997

(30) Foreign Application Priority Data

Mar. 26, 1996 (JP) ............................................. 8-097439
Apr. 2, 1996 (JP) ............................................. 8-106157
Nov. 28, 1996 (JP) ............................................. 8-334659

(51) Int. Cl.[7] .......................... B32B 27/08; B32B 27/36
(52) U.S. Cl. ........................ 428/480; 428/195; 525/413; 525/415; 525/425; 525/432; 525/434; 525/437; 525/444; 525/450
(58) Field of Search .................................. 428/480, 910, 428/195; 525/420, 425, 437, 444, 434, 450, 413, 415, 432

(56) References Cited

U.S. PATENT DOCUMENTS

| 4,826,493 A | 5/1989 | Martini et al. .............. 604/327 |
| 4,880,592 A | 11/1989 | Martini et al. .............. 264/514 |
| 5,124,371 A | 6/1992 | Tokiwa et al. .............. 523/124 |
| 5,227,415 A | 7/1993 | Masuda et al. .............. 524/17 |
| 5,464,689 A | 11/1995 | Matsumura et al. ..... 428/317.9 |
| 5,849,374 A | * 12/1998 | Gruber et al. ............. 428/34.3 |
| 5,891,576 A | * 4/1999 | Imai et al. ............... 428/411.1 |

FOREIGN PATENT DOCUMENTS

| EP | 0 401 844 B1 | 11/1995 |
| EP | 0 694 874 A2 * | 1/1996 |
| JP | 05042786 A | 2/1993 |
| JP | 05084876 A | 4/1993 |
| JP | 05085088 A | 4/1993 |
| JP | 05-163424 A | 6/1993 |
| JP | 05320323 A | 12/1993 |
| JP | 06340753 A | 12/1994 |
| JP | 08-073722 A | 3/1996 |
| JP | 08-188705 * | 7/1996 |

* cited by examiner

Primary Examiner—Vivian Chen
(74) Attorney, Agent, or Firm—J. Herbert O'Toole; Nexsen Pruet Jacobs & Pollard, LLC

(57) ABSTRACT

The present invention provides a card base which is degradable by microbes in natural environment. The card base is excellent in properties necessary for card bases, such as tensile strength, impact strength, flex temperature, heat resistance, resistance to thermal expansion and contraction, blocking resistance and humidity resistance, and has rigidity, bending resistance and durability. The card base contains, as essential components, a 3-hydroxybutylate/3-hydroxyvalerate copolymer and a lactic acid polymer, and, where necessary, a polycaprolactone or a high-molecular aliphatic polyester. The card base has a single-layer structure, or a sandwich structure further having overlay layers comprising a composition containing, as essential components, a lactic acid polymer and either or both of a polycaprolactone and a high-molecular alphatic polyester.

17 Claims, No Drawings

BIODEGRADABLE CARD BASE

TECHNICAL FIELD

The present invention relates to biodegradable card bases.

BACKGROUND ART

Credit cards, bank cards, prepaid cards, commuter passes, ID cards, patient's registration cards, etc. are used in everyday life.

These cards usually comprise, as a support material, a card base formed from a sheet comprising polyethylene terephthalate, polyvinyl chloride or like plastics or a sheet of paper coated with a resin. Specific examples are cards bearing glossy, clear color print of photographs or data for identification, which are obtained by thermally transferring photographs and characters using a hot stamp and hot-melt or heat-sublimable color films, and removing the films. For example, bank cards, credit cards or like thick cards can be prepared from card bases obtained by laminating a core layer (A) of polyvinyl chloride optionally printed on one or both sides, and overlay layers (B) of polyvinyl chloride optionally having a magnetic recording layer (magnetic strips) bonded by thermocompression. Such card bases are cut into cards, and provided with embossed characters for debossing the characters, or hot-stamped with photographs, where necessary.

When cards cut out from the card bases consisting of sheets of polyethylene terephthalate, polyvinyl chloride or like plastics are discarded after use, they are disposed of by landfill or incineration, together with other types of garbage. Also, wastes produced when cutting the card bases into cards are disposed of in the same manner.

In the case of incineration disposal, the card bases comprising plastics generate high combustion heat and tend to damage incinerators. In the case of the landfill disposal, polyethylene terephthalate, polyvinyl chloride and like plastics are not degradable in the earth and remain therein. Further, for recovering pulp from card bases comprising resin-coated paper, it is necessary to collect only the paper for separation, since resins are not degraded in alkaline solutions.

For solving the above problems, highly degradable plastics have been recently proposed as materials for biodegradable card bases. Examples of such plastics include copolymers of 3-hydroxybutylate (3-HB) and 3-hydroxyvalerate (3-HV) (hereinafter referred to as "3-HB/3-HV copolymers"); polycaprolactones; lactic acid polymers; and like biodegradable polymers. However, card bases prepared from 3-HB/3-HV copolymers are brittle and have poor bending resistance; card bases prepared from lactic acid polymers have poor solvent resistance; and card bases prepared from polycaprolactones have low rigidity (Young's modulus). These plastics are therefore unsuitable for card bases.

Further, thick cards having a heat-sensitive recording layer or a magnetic recording layer for receiving imprinting when so required, need to be capable of retaining the recorded data. Also, such cards are required to have excellent strength, rigidity and durability since they are usually carried with the owner. Further, they must have impact strength sufficient to bear embossed characters.

The cards obtained by cutting the card base may have color print of photographs or data for identification formed by thermal transfer technique, which usually comprises the steps of thermally transferring photographs and characters to the surfaces of the cards by hot stamping using films of cyan, yellow, magenta and carbon black, for example in this order, and removing the films. However, it is impossible to form glossy, clear photographs or characters on the card bases comprising the above biodegradable polymers, since inks cannot be fixed thereto because of poor amenability of the card bases to color printing.

An object of the present invention is to provide a card base which is degradable by microbes in natural environment; has properties necessary for card bases, such as strength, rigidity (Young's modulus), bending resistance and durability; and is well-balanced in mechanical strengths.

Another object of the present invention is to provide a card base which is excellent in surface gloss, surface protection properties, strength, rigidity, and capability of bearing embossed characters formed as required; and is degradable by microbes in natural environment.

The embossed characters are formed on the cards when so required, in order to imprint the characters on sales slips or journal slips in CD or ATM, as visual proofs of use of the cards.

The card base of the invention can bear glossy, clear color print of photographs or data for identification, which are formed by a thermal transfer technique such as hot-stamping. The card base of the invention is excellent in properties necessary for cards, such as tensile strength, impact strength, flex temperature, lamination properties, heat resistance, resistance to thermal expansion and contraction, chemical resistance, blocking resistance and humidity resistance; has rigidity, bending resistance, durability, etc.; and is degradable by microbes in natural environment.

DISCLOSURE OF INVENTION

The present invention provides a biodegradable card base (hereinafter referred to as "the first invention") comprising a composition containing 86 to 31 wt. % of a 2-hydroxybutyrate/3-hydroxyvalerate copolymer, 9 to 46 wt. % of a lactic acid polymer and 5 to 23 wt. % of a polycaprolactone, as essential components.

The present invention also provides a biodegradable card base (hereinafter referred to as "the second invention") comprising core layer(s) (A1) comprising a composition containing 90 to 40 wt. % of a 3-hydroxybutyrate/3-hydroxyvalerate copolymer and 10 to 60 wt. % of a lactic acid polymer as essential components; and overlay layers (B1) comprising a composition containing 95 to 60 wt. % of a lactic acid polymer and 5 to 40 wt. % of a polycaprolactone as essential components; the core layer(s) (A1) being sandwiched between the overlay layers (B1).

The present invention further provides a biodegradable card base (hereinafter referred to as "the third invention") comprising core layer(s) (A2) comprising a composition containing a 3-hydroxybutyrate/3-hydroxyvalerate copolymer, a lactic acid polymer and a high-molecular aliphatic polyester obtained by dehydrating polycondensation of a glycol and an aliphatic dicarboxylic acid, and overlay layers (B2) comprising a composition containing a lactic acid polymer and a high-molecular aliphatic polyester obtained by dehydrating polycondensation of a glycol and an aliphatic dicarboxylic acid; the core layers (A1) being sandwiched between the overlay layers (B1).

The 3-HB/3-HV copolymer for use in the present inventions (first to third inventions) is, for example, an aliphatic polyester biodegradable resin with a melting point of 100 to 180° C. biosynthesized by microbes such as hydrogen bacteria (*Algaligenes eutrophus*). The 3-HV/3-HV copolymer contains preferably 1 to 20 mol % of 3-hydroxyvalerate, from the viewpoint of processability. If the proportion of 3-hydroxyvalerate is less than 1 mol %, the card base becomes stiff and brittle because of high crystallinity of the polymer. Further, the polymer is likely to be deteriorated by heat in the molding process, because of its high melting point. If the proportion exceeds 20 mol %, the card base becomes soft because of low crystallinity and melting point of the polymer. However, the above range is not limitative.

The lactic acid polymer for use in the first to third inventions is preferably a polylactic acid, such as a lactic acid monopolymer obtained by direct dehydrating polycondensation of L-lactic acid, D-lactic acid or D,L-lactic acid, or a polymer obtained by ring-opening polymerization of lactide, i.e., a cyclic dimer of lactic acid. Also usable are copolymers obtained by direct dehydrating polycondensation of one of the above lactic acids and another hydroxycarboxylic acid (such as glycolic acid, 3-hydroxybutyric acid, 4-hydroxybutyric acid, 3-hydroxyvaleric acid, 4-hydroxyvaleric acid or 6-hydroxycaproic acid), and copolymers obtained by ring-opening polymerization of a lactide with a copolymerizable monomer selected from cyclic ester intermediates of hydroxycarboxylic acid [e.g., dimer of glycolic acid (glycolide), cyclic ester of 6-hydroxycaproic acid (caprolactone)]. As clear from the above, the lactic acid polymer may be a polylactic acid or a lactic acid copolymer. These lactic acid polymers maybe used singly or in combination. The lactic acid content in the lactic acid polymer is 30% or more, preferably 50% or more, more preferably 70% or more, particularly 90% or more.

The direct polycondensation is carried out by subjecting the lactic acid, either alone or in combination with another hydroxycarboxylic acid, to azetropic dehydrating condensation in the presence of an organic solvent, in particular a phenyl ether solvent; removing water from the solvent distilled out by the azeotropy; and returning the substantially water-free solvent to the reaction system, whereby a high-molecular weight lactic acid polymer with high strength can be obtained. However, the above process is not limitative.

The number average molecular weight Mn of the lactic acid polymer is not limited, but is preferably 50,000 to 1,000,000. If the number average molecular weight Mn is less than 50,000, the resulting card base has low strength, whereas if the number average molecular weight Mn exceeds 1,000,000, the resulting composition tends to have a poor moldability.

Examples of useful polycaprolactones are aliphatic polyesters represented by the formula

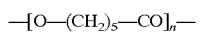

which is obtained by ring-opening polyaddition of ε-caprolacton, i.e., a cyclic monomer, with an organic metal compound catalyst.

Among these polycaprolactones, those having a Vicat softening temperature (as determined according to JIS K-7206) of 100° C. or more are preferred. A polycaprolactone with a Vicat softening temperature less than 100° C. tends to reduce the heat resistance and moldability of the composition. The polycaprolactone preferably has a number average molecular weight Mn of 1,000 to 120,000. If the number average molecular weight Mn is less than 1,000, the resulting card base tends to have reduced strength and rigidity, whereas if the number average molecular weight Mn exceeds 120,000, the resulting composition tends to have lower moldability. However, the above ranges are not limitative.

For raising the Vicat softening temperature, a composition consisting of any of the above polycaprolactones and an aliphatic polyester (one other than poly-ε-caprolactone, for example, polybutylene succinate or polybutylene succinate adipate).

The process for preparing the compositions forming the biodegradable card base of the invention is not limited, and may be any of conventional processes for preparing polyolefin resins or like compositions. Examples of such processes are those using a kneader, Banbury mixer or roll mill; those suing a single-screw or twin-screw extruder, wherein the starting materials are thermally melted and kneaded and formed into pellets are the like; and those suing a ribbon blender, Henschel mixer or tumbling mixer.

Where necessary, the composition for use in the invention may further contain other synthetic resins, additives and fillers, such as heat stabilizers, antioxidants, antistatic agents, lubricants, antibacterial agents, pigments or dyes, titanium oxide, calcium carbonate, calcium sulfate, barium sulfate, magnesium hydroxide, silica and talc, insofar as they do not adversely affect the properties of the biodegradable card base of the invention, such as biodegradability, strength, rigidly (Young's modulus), bending resistance and mechanical strength balance.

The synthetic resins are not limited, but include other biodegradable resins such as poly-3-hydroxybutyrate, poly-3-hydroxyvalerate, 3-hydroxybutyrate/3-hydroxypropionate copolymers, 3-hydroxybutyrate/4-hydroxybutyrate copolymers, and poly-3-hydroxyalkanoate.

The following is detailed description of the first to third inventions.

First Invention

The biodegradable card base of the first invention may consists merely of a composition containing 86 to 31 wt. % of the 3-HB/3-HV copolymer, 9 to 46 wt. % of the lactic acid polymer and 5 to 23 wt. % of the polycaprolactone, or may further contain other components within a range that does not adversely affect the properties of the card base. The card base contains the above composition in a proportion of usually 50 wt. % or more, preferably 70 wt. % or more, more preferably 90 wt. % or more.

If the proportion of the 3-HB/3-HV copolymer is less than 31 wt. %, the card base is poor in solvent resistance and printability. If the proportion exceeds 86 wt. %, the strength and rigidity tends to reduce.

If the proportion of the lactic acid polymer is less than 5 wt. %, the strength and rigidity decrease, whereas if the proportion of said polymer exceeds 46 wt. %, the acid resistance and printability reduce. A polycaprolactone content of less than 5 wt. % disturbs the balance of mechanical strength of the card base in the machine and transverse directions. In such a case, other materials may be laminated on the card base. If the proportion of the polycaprolactone exceeds 23 wt. %, the resulting card base will have lowered strength and rigidity. The polycaprolactone makes the other components, i.e., 3-HB/3-HV copolymer and lactic acid polymer, mutually soluble to thereby increase the mechanical strength balance of the card base.

The process for molding the card base of the first invention is not limited. The card base can be molded by, for example, a T-die extrusion process as follows. First, a composition containing the 3-HB/3-HV copolymer, lactic acid polymer, polycaprolactone and other optical biodegradable resins, additives, fillers, etc. is fed to the hopper of an extruder equipped with a T-die.

Subsequently, the T-die extruder is set at, for example, a cylinder temperature of 150 to 190° C. and a die temperature of 160 to 200° C. for melting, kneading and extruding the composition. The extruded sheet is cooled with a cooling roll at a surface temperature of about 40 to 70° C., or ice- or air-cooled for setting, and rolled up.

The card base of the first invention may be non-oriented, or uniaxially or biaxially oriented. The card base can be heat-set, when so required.

The orientation increases the rigidity and prevents the card base from breaking when being bent. The oriented card base may be heat-set. The heating setting improves the mechanical strength balance.

The process for orientation is not limited, but is preferably the successive biaxial orientation process wherein the extruded sheet is oriented first in the machine direction and then in the transverse direction. The orientation temperature and draw ratio are not limited, but, preferably, the former is 40 to 80° C. and the latter is about 1.5 to 4.0 times in both the machine and transverse directions. The heat setting can be effected, for example, at 100 to 130° C. in about 25 to 120 seconds.

The biodegradable card base of the first invention can be molded by other processes. Examples are blow-film extrusion using a ring die, calendering, milling, etc. However, preferred is the T-die extrusion wherein the composition is melted and extruded using a T-die.

The thickness of the card base is not limited, but may be about 250 to 800 $\mu$m in the case of thick card bases for bank cards, credit cards, etc.; and about 100 to 250 $\mu$m in the case of thin card bases for telephone cards and like prepaid cards.

The thus molded card base can be used as it is for various purposes. For example, the card base is preferably usable as a biodegradable card base for credit cards, bank cards, prepaid cards, commuter passes, ID cars, patient's registration cards, etc. Further, the card base can be used for any purposes wherein biodegradability in natural environment is required, for example, nursery pots, packaging containers, materials for civil engineering, etc. Thus, there are no limitations on use of the card base.

In the following description, the core layer(s) and overlay layers in the second invention will be referred to as the core layer(s) (A1) and the overlay layers (B1), respectively; and those of the third invention as the core layer(s) (A2) and the overlay layer(s) (B2), respectively.

Second Invention

The core layer(s) (A1) may consist merely of a composition containing 90 to 40 wt. % of the 3-HB/3-HV copolymer and 10 to 60 wt. % of the lactic acid polymer as essential components, or may contain other components within a range that does not adversely affect the properties of the core layer(s) (A1). If the proportion of the 3-HB/3-HV copolymer is less than 40 wt. % (i.e., if the proportion of the lactic acid polymer exceeds 60 wt. %), the solvent resistance and printability decrease. If the proportion of the 3-HB/3-HV copolymer exceeds 90 wt. % (i.e., if the proportion of the lactic acid polymer is less than 10 wt. %), the impact strength and rigidity reduce.

A card base consisting of the core layer(s) (A1) alone is not practical, since such a card base tends to have a poor balance of mechanical strength in the machine and transverse directions. According to the invention, overlay layers (B1) are provided on the core layer(s) (A1) so as to make up for the shortcomings of the core layer(s) (A1). That is, the core layer(s) (A1) is practically usable as a card base only when having the overlay layers (B1) laminated thereon.

The overlay layers (B1) may consist merely of a composition containing 95 to 60 wt. % of the lactic acid polymer and 5 to 40 wt. % of the polycaprolactone as essential components, or may contain other components within a range that does not adversely affect the properties of the overlay layers (B1). The proportion of each of the above compositions forming the core layer(s) (A1) and the overlay layers (B1) is usually 50 wt. % or more, preferably 70 wt. % or more, more preferably 90 wt. % or more.

For improving the mechanical strength balance, the core layer(s) (A1) may contain the above polycaprolactone in a proportion of 23 wt. % or less based on the total weight of the polymer components in the composition containing the 3-hydroxybutyrate/3-hydroxyvalerate copolymer, lactic acid polymer and polycaprolactone. If the proportion of the polycaprolactone exceeds 23 wt. % the resulting card tends to have poor embossability.

Although the more material of the card base preferably consists merely of the core layer(s) (A1) comprising the composition containing the 3-HB/3-HV copolymer and lactic acid polymer as essential components, a layer comprising a composition containing a 3-HB/3-HV copolymer, a lactic acid polymer and a polycaprolactone as essential components may be laminated on the core layer(s) (A1).

The overlay layers (B1) comprises a composition containing the lactic acid polymer and polycaprolactone as essential components, and laminated on the core layer(s) (A1) of the card base. The overlay layers (B1) protect the printed surface of the core layer(s) (A1); make the printing more distinctive due to their high transparency; and improve the embossability, adhesion to magnetic recording layers or like layers, and amenability to hot stamping of characters, patterns, photographs, etc.

The card base of the second invention, when used for bank cards, credit cards, etc., bears embossed characters on its surface when so required. It is generally preferable that the embossed characters have a height of about 430 to 480 $\mu$m relative to the surrounding surface of the overlay layers (B1). If the height is less than 430 $\mu$m, the impression on, for example, journal slips tends to be unclear, whereas if the height exceeds 480 $\mu$m, the embossed characters tend to crack or craze, and the card is likely to warp. However, the above range is not limitative.

Preferable proportions of the lactic acid polymer and polycaprolactone in the overlay layers (B1) are 95 to 60 wt. % and 5 to 40 wt. %, respectively. If the proportion of the polycaploractone is less than 5 wt. % (if the proportion of the lactic acid polymer exceeds 95 wt. %), the overlay layers (B1) tends to be brittle, whereas if the proportion of the polycaprolactone exceeds 40 wt. % (if the proportion of the lactic acid polymer is less than 60 wt. %), the rigidity is likely to reduce.

The card base of the second invention comprises core layer(s) (A1) comprising a composition containing the 3-HB/3-HV copolymer and lactic acid polymer as essential components, and overlay layers (B1) comprising a composition containing the lactic acid polymer and polycaprolactone as essential components, the core layer(s) (A1) and overlay layers (B1) being arranged to form a three-layer structure (B1)/(A1)/(B1) or a four-layer structure (B1)/(A1)/(A1)/(B1).

If the card base of the second invention has the four-layer structure (B1)/(A1)/(A1)/(B1), a core material printed on both sides can be readily obtained without troublesome procedures for double-side printing. That is, a card base printed on both sides can be easily obtained by printing desired images or the like on one side of each of the two core layers (A1), laminating each overlay layer (B1) and each core layer (A1) so as to cover the printed side, and bonding the non-printed sides of the core layers (A1) to each other.

Specifically, a card base printed on both sides can be obtained, for example, as follows. First, at least two core layers (A1 and at least two overlay layers (B1) are separately molded. Images or the like are printed on one side of each of two core layers (A1) by the offset or silk screen process. Then, the two printed core layers (A1) and two overlay layers (B1) are arranged so that the printed side of each core layer (A1) is covered with each overlay layer (B1). Then, the non-printed sides of the core layers (A1) are faced to each other, giving an unbonded card base having a sandwich structure (B1)/(A1)/(A1)/(B1). The unbonded card base is then held between mirror plates, compressed, heated and cooled to obtain a card base having a printed layer on both sides.

The process for preparing the card base of the second invention is not limited. Exemplary processes includes dry lamination wherein the overlay layers (B1) are laminated on the core layer(s) (A1) with an adhesive; co-extrusion wherein the overlay layers (B1) are laminated on the core layer(s) (A1) using a co-extrusion die connected to at least two extruders; and thermocompression bonding wherein at least two types of layers for card bases, for example core layer(s) (A1) and overlay layers (B1), are separately prepared and laminated by thermocompression.

Among these processes, preferred is the thermocompression bonding, which comprises the steps of molding one or two core layers (A1) and two overlay layers (B1) separately; sandwiching the core layer(s) between the overlay layers (B1) to give an unbonded card base having, for example, a (B1)/(A1)/(B1) or (B1)/(A1)/(A1)/(B1) structure; holding the unbonded card base between metal mirror plates; and compressing, heating, and cooling the card base. The compression can be carried out, for example, at a pressure of 5 to 40 kg/cm$^2$ and a heating temperature of 140 to 190° C., in a period of 30 seconds to 30 minutes. However, these ranges are not limitative.

The card base of the second invention, which has the (B1)/(A1)/(B1) of (B1)/(A1)/(A1)/(B1) structure, may be non-oriented, or the core layer(s) (A1) and/or overlay layers (B1) may be uniaxially or biaxially oriented, without limitations.

Orientation of the core layer(s) (A1) and/or overlay layers (B1) increases the rigidity, and prevents the card base from breaking when being bent. Where necessary, the oriented card base may be heat-set. Heat setting improves the mechanical strength balance.

The process for orientation is not limited, but is preferably the successive biaxial orientation process wherein the layers are oriented first in the machine direction and then in the transverse direction. The orientation temperature and draw ratio are not limited but, preferably, the former is 40 to 80° C. and the latter is about 1.5 to 4.0 times in both the machine and transverse directions. The heat setting can be effected, for example, at 100 to 130° C. in about 25 to 120 seconds.

When the card base of the second invention is used for thick cards, the core layer(s) (A1) is preferably about 720 to 480 μm thick, and the overlay layers (B1) are preferably about 20 to 140 μm thick. For thin cards, the core layer(s) (A1) is preferably about 50 to 210 μm thick, and the overlay layers (B1) are preferably about 20 to 100 μm thick. However, these ranges are not limitative. In the above description of thickness, the thickness of the core layer(s) is indicated as the total thickness of the core layers, if two or more core layers exist.

Specifically, the thick card base can be preferably used for bank cards, credit cards and the like, which may bear magnetically recorded information and/or embossed characters, and which are used frequently for a long period. The thick card base may have one or two core layer(s) (A1) each having a thickness of about 240 to 360 μm. There are no limitations on the thickness of the core layer(s). The thin card base does not limited in use, but can be preferably used as telephone cards or like prepaid cards which are not required to bear embossed characters and which are used for a relatively short period.

The card base of the second invention may be provided with a printing layer or a heat-sensitive recording layer when so required. These layers are preferably provided on the surface of the overlay layers (B1) or between one core layer (A1) and one overlay layer (B1). When the card base is used for magnetic cards, the magnetic recording layer (such as a magnetic stripe) is formed on the surface of the overlay layers by a suitable process, before or after cutting the card base into cards. For making thick cards such as bank cards or credit cards, characters can be preferably embossed on the surfaces of the cards, for example, after cutting the card base into cards.

The card base of the second invention is suitable for thick cards on which characters are embossed.

Third Invention

The high-molecular weight aliphatic polyester for use in the core layer(s) (A2) and the overlay layers (B2) of the third invention is not limited, but may be, for example, one obtained by subjecting a glycol, a dicarboxylic acid (or a dicarboxylic anhydride), and an optional third component, which is at least one polyfunctional component selected from the group consisting of tri- or tetrafunctional polyhydric alcohols, oxycarboxylic acids, polycarboxylic acids and polycarboxylic anhydrides, to dehydrating polycondensation to prepare a prepolymer having a hydroxyl group at the end of its molecule, and imparting a high molecular weight to the prepolymer using a coupling agent. However, the high-molecular weight aliphatic polyester is not limited to the one described above.

The high-molecular aliphatic polyester has a number average molecular weight (Mn) of 10,000 or more, preferably 40,000 or more, more preferably about 50,000 to 300,000. If the average number molecular weight (Mn) is less than 10,000, the resulting card base is unlikely to be improved in rigidity and strength.

Examples of usable high-molecular weight aliphatic polyesters include those represented by the following formula:

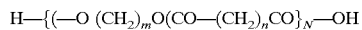

wherein m is an integer of 1 to 6, preferably 1 to 4, n is an integer of 1 to 6, preferably 1 to 4, and N is a number that makes the molecular weight of the polymer 10,000 or more, preferably 40,000 or more, more preferably about 50,000 to 300,000.

The high-molecular weight aliphatic polyester has the following chain structure. For example, when the coupling agent added to the polyester prepolymer is diisocyanate, the chain structure is formed via urethane bonds based on the isocyanate; and when the coupling agent is oxaline or a diepoxy compound, the chain structure is formed via ester bonds.

Examples of specific high-molecular weight aliphatic polyesters include polyethylene succinate (m=2, n=2), polybutylene succinate (m=4, n=2), and polybutylene succinate·adipate (m=4, n=2,4).

In the third invention, the glycol in the high-molecular weight aliphatic polyester for use in the core layer(s) (A2) and the overlay layers (B2) is, for example, a $C_{1-10}$ straight- or branched-chain aliphatic or alicyclic glycol such as ethylene glycol, 1,4-butanediol, 1,6-hexanediol, decamethylene glycol, neopentyl glycol or 1,4-cyclohexane dimethanol. These glycols may be used in combination. Among them, 1,4-butanediol is preferred.

Examples of dicarboxylic acids (including dicarboxylic anhyhdrides) to be reacted with the glycol for forming the high-molecular weight aliphatic polyester include succinic acid, adipic acid, suberic acid, sebacic acid, dodecanoic acid, succinic anhydride and adipic anhydride. These dicarboxylic acids may be used singly or in combination. Particularly preferred are succinic acid and adipic acid.

In addition to the glycol and dicarboxylic acid, the high-molecular weight aliphatic polyester may contain, where necessary, a third component which is at least one polyfunctional component selected from the group consisting of tri- or tetrafunctional polyhydric alcohols (e.g., trimethylolpropane, glycerine and pentaerythrite), tri- or tetrafunctional polyoxycarboxylic acids (e.g., malic acid, citric acid and tartaric acid), and tri- or tetrafunctional polycarboxylic acids and polycarboxylic anhydrides (e.g., trimesic acid, propanetricarboxylic acid, pyromellitic anhydride, benzophenonetetracarboxylic anhydride and cyclopentanetetracarboxyic anhydride).

Addition of the third component produces a long branched chain, and is likely to impart a higher molecular weight and a wide molecular weight distribution to the high-molecular weight aliphatic polyester. Thus, the resulting polyester has properties preferable for film-forming. The proportion of the third component is about 0.1 to 5 mol % in the case of a trifunctional component, or about 0.1 to 3 mol % in the case of a tetrafunctional component, based on the total amount of the aliphatic dicarboxylic acids (or aliphatic dicarboxylic anhydrides), so as to preclude gel formation.

The high-molecular weight aliphatic polyester has a melting point of about 70 to 190° C., preferably about 70 to 150° C., particularly about 80 to 135° C. If the melting point is less than 70° C., the heat resistance will be insufficient, whereas if the melting point is more than 190° C., it becomes difficult to prepare a card base from the resulting composition. For preparing the polyester having a melting point of 70° C. or more, the melting point of the polyester prepolymer is preferably 60° C. or more, but is not limited.

In the card base of the third invention, the core layer(s) (A2) preferably comprises a composition containing 82 to 27 wt. % of the 3-HB/3-HV copolymer, 9 to 40 wt. % of the lactic acid polymer and 9 to 33 wt. % of the high-molecular weight aliphatic polyester as essential components. If the proportion of the 3-HB/3-HV copolymer is less than 27 wt. %, the solvent resistance and printability will reduce, whereas if the proportion exceeds 82 wt. %, the tensile strength, rigidity, impact strength, etc. tend to reduce.

If the proportion of the high-molecular weight aliphatic polyester is less than 9 wt. %, the printability of the core layer(s) (A2) and the adhesion between the two core layers (A2) or between the core layers (A2) and overlay layers (B2) are unlikely to improve. If the proportion exceeds 33 wt. %, the card base tends to have reduced rigidity.

The core layer(s) (A2) is excellent in properties necessary for card bases, i.e., tensile strength, impact strength, flex temperature, lamination properties, heat resistance, resistance to thermal expansion and contraction, chemical resistance, blocking resistance and humidity resistance; has rigidity, bending resistance, durability and capability of supporting the overlay layers (B2).

On the surface of the overlay layers (B2), glossy and clear photographs and data for identification can be printed by thermally transferring photographs and characters using a hot stamp and color films and removing the films. For such a purpose, the overlay layers (B2) laminated on the core layer(s) (A2) preferably comprises a composition containing 99 to 67 of the lactic acid polymer and 1 to 33 wt. % of the high-molecular weight aliphatic polyester as essential components.

If the proportion of the high-molecular weight aliphatic polyester is less than 1 wt. %, the overlay layers (B2) become brittle and has insufficient adhesion to the color films, deteriorating the distinctiveness of the photographs and characters. On the other hand, if the proportion exceeds 33 wt. %, the color films cannot be readily removed, making the thermal transfer printing difficult.

For improving the strength, the overlay layers (B2) may further contain a polycaprolactone in a proportion of 27 wt. % or less based on the total weight of the composition of the lactic acid polymer, high-molecular weight aliphatic polyester and polycaprolactone. If the proportion of the polycaprolactone exceeds 27 wt. %, the resulting overlay layers tend to have low rigidity and not suitable for cards.

The overlay layers (B2) comprise the above composition, and are laminated on the surface of the core layer(s) (A2) for protecting the surface having, for example, offset print or silkscreen print. The overlay layers (B2) have high transparency and improve the distinctiveness of the print, embossability of the card base, and adhesion of the card base to magnetic stripes. Further, the overlay layers (B2) make it possible to print glossy, clear photographs and characters for identification on credit cards, ID cards, membership cards, etc.

The card base of the third invention comprises the core layer(s) (A2) and the overlay layers (B2) and preferably has a three-layer structure (B2)/(A2)/(B2) or a four-layer structure (B2)/(A2)/(A2)/(B2).

If the card base of the third invention has the four-layer structure (B2)/(A2)/(A2)/(B2), a core material printed on both sides can be readily obtained without troublesome procedures for double-side printing. That is, a card base printed on both sides can be easily obtained by printing desired images or characters on one side of each of the two core layers (A2), laminating one overlay layer (B2) on each core layer (A2) so as to cover the printed side, and bonding the non-printed sides of the core layers (A2) to each other.

Specifically, the double-side printed card base can be produced, for example, as follows. First, at least two core layers (A2) and at least two overlay layers (B2) are separately molded.

The overlay layers (B2) may comprise a composition containing 73 wt. % or more of the lactic acid polymer and high-molecular weight aliphatic polyester combined, and 27 wt. % or less of the polycaprolactone.

Subsequently, images or characters are printed on one side of each of two core layers (A2) by the offset or silk screen process. The printed two core layers (A2) and two overlay layers (Bs) are arranged so that the printed side of each core layer (A2) is covered with each overlay layer (B2), and then the non-printed sides of the core layers (A2) are faced to each other, giving an unbonded card base having a sandwich structure (B2)/(A2)/(A2)/(B2). The unbonded card base is then held between mirror plates, compressed, heated and cooled to obtain a card base having a printed layer on both sides.

The process for preparing the card base of the third invention is not limited. Exemplary processes includes dry lamination wherein the core layer(s) (A2) and the overlay layers (B2) are laminated with an adhesive; co-extrusion wherein the core layer(s) (A2) and the overlay layers (B2) are laminated using a co-extrusion die connected to at least two extruders; and thermocompression bonding wherein at least two types of layers for card bases, for example core layers (A1) and overlay layers (B1), are separately prepared and laminated by thrmocompression.

Among these processes, preferred is the thermocompression bonding, which can be effected, for example, at a pressure of 3 to 40 kg/cm² and a heating temperature of 140 to 190° C., in a period of 30 seconds to 30 minutes. However, these ranges are not limitative.

The card base of the third invention, which has the (B2)/(A2)/(B2) or (B2)/(A2)/(A2)/(B2) structure, may be non-oriented, or the core layer(s) (A2) and/or overlay layers (B2) may be uniaxially or biaxially oriented, without limitations.

Orientation of the core layer(s) (A2) and/or overlay layers (B2) increases the rigidity, and prevents the card base from breaking when being bent. Where necessary, the oriented card base may be heat-set. Heat setting tends to improve the mechanical strength balance.

The process for orientation is not limited, but is preferably the successive biaxial orientation process wherein the extruded layers are oriented first in the machine direction and then in the transverse direction. The orientation temperature and draw ratio are not limited, but, preferably, the former is 40 to 80° C. and the latter is about 1.5 to 4.0 times in both the machine and transverse directions. The heat setting can be carried out, for example, at 100 to 130° C. and in about 25 to 120 seconds.

The card base of the third invention can be made into, for example, an ID card, by the following process. First, a card is obtained by cutting the above card base. Then, images and characters such as color photographs and data for identification are thermally transferred to the surface of the overlay layers (B2) using a hot stamp and color films (ribbons) having hot-melt or heat-sublimable ink layers containing colors (such as cyan, yellow, magenta and carbon black) and waxes. The color films are then removed, giving a biodegradable ID card bearing glossy, clear color photographs and characters printed thereon.

The card base of the third invention has properties necessary for card bases, such as tensile strength, rigidity, bending resistance and impact strength. Each core layer (A2) is preferably about 720 to 480 µm thick when the card base has one core layer (A2), and about 360 to 240 µm thick when the card base has two core layers (A2) so that the overlay layers (B2) are sufficiently supported. Each overlay layer (B2) is preferably about 20 to 140 µm thick.

The card base of the third invention is excellent in retentivity and recordability of color images and characters, such as photographs or data for identification, which are printed on the overlay layers (B2). Accordingly, the card base can retain clear color images and characters for a long period, and is suitable for ID cards, credit cards, patient's registration cards, membership cards or like cards which bear photographs and data for identification.

The card base of the third invention may have a printing layer or a heat-sensitive recording layer where necessary. These layers are preferably provided on the surface of the overlay layers (B2) or between the core layer(s) (A2) and the overlay layers (B2). For preparing magnetic cards, the magnetic recording layer (such as a magnetic stripe) is formed on the surface of the overlay layers (B2) by a suitable process before or after cutting the card base into cards. For thick cards such as bank cards or credit cards, characters are preferably embossed on the surfaces of the cards by a suitable process, for example, after cutting the card base into cards. It is generally preferable that the embossed characters have a height of about 430 to 480 µm relative to the surrounding surface of the overlay layers (B1). If the height is less than 430 µm, the embossed characters tend to make an unclear impression on, for example, journal slips, whereas if the height exceeds about 480 µm, the embossed characters tend to crack or craze, and the card is likely to warp. However, the above ranges are not limitative.

The card base of the third invention can bear, for example, on the surface of the overlay layers (B2), clear color photographs and characters for identification printed by thermal transfer process after cutting the card base into cards. The card base is sufficient in bending resistance, tensile strength, impact resistance, flex temperature, lamination properties, heat resistance, resistance to thermal expansion and contraction, chemical resistance, blocking resistance and humidity resistance, and is degradable by microbes in natural environment.

It is to be noted that the above disclosure of the invention mainly comprises preferred embodiments and is not intended to limit the scope of the invention.

BEST MODE FOR CARRYING OUT THE INVENTION

Examples and Comparative Examples will be given below to illustrate the present invention in further detail, but they are in no way limitative of the scope thereof. In these examples, properties of the card base samples were measured by the following methods.

First Invention

[Tensile strength (kg/cm²)]: JIS-K6732
[Tensile elongation (%)]: JIS-K6732
[Cross-directional tear strength]: JIS-K6732
[Young's modulus (×10⁴ kg/cm²)]: ASTM D882
[Biodegradability]: a conventional method comprising the steps of cutting a biodegradable card base into pieces (85.5 mm×54 mm), dipping the pieces in returned sludge at 25° C. collected and treated in a water purification center (in Konan Chubu Office of Shiga Sewage Corporation) and measuring the weight loss

EXAMPLE 1A

A composition for use as a starting material for a biodegradable card base was prepared by blending in a ribbon blender 40 wt. % of a 3-hydroxybutyrate/3-hydroxyvalerate copolymer (3-hydroxyvalerate content: 8 mol %); 40 wt. % of a polylactic acid with an average molecular weight Mn of 200,000 (a polymer obtained by ring-opening polymerization of L-lactic acid lactide; 17 wt. % of a polycaprolactone with a Vicat softening temperature of 104° C. and an average molecular weight Mn of 80,000; and 3 wt. % of $TiO_2$.

The composition was melted and kneaded in a T-die extruder set at a cylinder temperature of 180° C. and a die temperature of 190° C., extruded on a casting roll at a surface temperature of about 60° C. for cooling and setting, and rolled up, whereby a 200 µm thick biodegradable card base was obtained.

Table 1 shows the tensile strength, tensile elongation, cross-directional tear strength, Young's modulus of the obtained card base.

The card base, when cut into cards, were sufficiently reliable for practical use.

As an index of biodegradability, a weight loss was measured after dipping cards prepared from the card base in activated sludge at 25° C. for 28 days. The weight loss was about 70 wt. %.

TABLE 1

| | Ex. 1 | Ex. 2 | Ex. 3 | Ex. 4 | Ex. 5 |
|---|---|---|---|---|---|
| Thickness ($\mu$m) | 200 | 500 | 200 | 200 | 200 |
| Tensile strength (kg/cm$^2$) | | | | | |
| MD | 413.8 | 395.8 | 363.4 | 285.6 | 281 |
| TD | 399.3 | 389.5 | 348.5 | 280.1 | 284 |
| Tensile elongation (%) | | | | | |
| MD | 5 | 5 | 5 | 10.0 | 7.5 |
| TD | 5 | 5 | 5 | 10.0 | 7.5 |
| Cross-directional tear strength (kg/cm$^2$) | | | | | |
| MD | 168.4 | 184.5 | 139.5 | 89.1 | 78.4 |
| TD | 153.8 | 161.5 | 130.1 | 92.6 | 79.5 |
| Young's modulus ×10$^4$ (kg/cm$^2$) | | | | | |
| MD | 2.01 | 1.83 | 1.74 | 1.17 | 1.28 |
| TD | 1.89 | 1.80 | 1.69 | 1.20 | 1.25 |

EXAMPLE 2A

A 500 $\mu$m thick biodegradable card base was prepared by following the procedure of Example 1A with the exception of using, in place of the polylactic acid, a copolymer obtained by direct dehydrating polycondensation of L-lactic acid and glycolic acid. Table 1 shows the tensile strength, tensile elongation, cross-directional tear strength and Young's modulus of the obtained card base.

The card base, when shaped into cards, was sufficiently reliable for practical use.

As an index of biodegradability, the weight loss was measured in the same manner as in Example 1A. The weight loss after 28 days was about 10 wt. %.

EXAMPLE 3A

A 200 $\mu$m thick bioderadable card base was prepared by following the procedure of Example 1A with the exception of using a composition obtained by blending, in a ribbon blender, 48 wt. % of a 3-hydroxybutyrate/3-hydroxyvalerate copolymer (3-hydroxyvalerate content: 8 mol %); 40 wt. % of the same polylactic acid as used in Example 1A, which had an average molecular weight Mn of 200,000 and had been obtained by ring-opening polymerization of L-lactic acid lactide; 9 wt. % of the same polycaprolactone with an average molecular weight Mn of 80,000 as used in Example 1A; and 3 wt. % of TiO$_2$. Table 1 shows the tensile strength, tensile elongation, cross-directional tear strength and Young's modulus of the card base.

The card base, when shaped into cards, was sufficiently reliable for practical use.

As an index of biodegradability, the weight loss was measured in the same manner as in Example 1A. The weight loss after 28 days was about 70 wt. %.

COMPARATIVE EXAMPLE 1A

A 200 $\mu$m thick biodegradable card base was prepared by following the procedure of Example 1A with the exception of using a composition obtained by blending, in a tumbling mixer, 48 wt. % of a 3-hydroxybutyrate/3-hydroxyvalerate copolymer (3-hydroxyvalerate content: 8 mol %); 48 wt. % of polycaprolactone with a Vicat softening temperature of 104° C. and an average molecular weight Mn of 80,000; and 4 wt. % of TiO$_2$. Table 1 shows the tensile strength, tensile elongation, cross-directional tear strength and Young's modulus of the card base.

As an index of biodegradability, the weight loss was measured in the same manner as in Example 1A. The weight loss after 28 days was about 70 wt. %, which was substantially the same as in Example 1A.

However, the above obtained card base was inferior in tensile strength, cross-directional tear strength and Young's modulus. Accordingly, the card base was not practically usable.

COMPARATIVE EXAMPLE 2A

A 200 $\mu$m thick biodegradable card base was prepared by blending 97 wt. % of a 3-hydroxybutyrate/3-hydroxyvalerate copolymer (3-hydroxyvalerate content: 8 mol %) and 3 wt. % of TiO$_2$, melting and kneading the obtained composition in a T-die extruder set at a cylinder temperature of 160° C. and a die temperature of 165° C., extruding the composition on a cooling roll at a surface temperature of about 60° C. for cooling and setting, and rolling up the resulting sheet.

Table 1 shows the tensile strength, tensile elongation, cross-directional tear strength and Young's modulus of the card base.

As an index of biodegradability, the weight loss was measured in the same manner as in Example 1A. The weight loss after 28 days was about 70 wt. %, which was substantially the same as in Example 1A.

However, the above obtained card base was inferior in tensile strength, cross-directional tear strength and Young's modulus. Accordingly, the card base was not practically usable.

As seen from Table 1, the card bases of the invention prepared from a composition containing a 3-hydroxybutyrate/3-hydroxyvalerate copolymer, a polylactic acid and a polycaprolactone as essential components is excellent in tensile strength, tensile elongation, cross-directional tear strength and Young's modulus.

Desirable cards can be obtained by cutting the biodegradable card bases of the invention.

In contrast, the biodegradable card bases obtained in Comparative Examples 1A and 2A tend to be inferior in tensile strength, cross-directional tear strength and Young's modulus. That is, these card bases are poor in rigidity and mechanical strength. Biodegradable cards formed from such card bases will be poor in bending resistance, durability, etc., and are not preferable.

Conventional card bases consisting of polyethylene phthalate and polyvinyl chloride are disadvantageous in that they are not degradable in natural environment, although having good properties as cards.

SECOND AND THIRD INVENTIONS

[Tensile strength (kg/cm$^2$)]: It is necessary that the tensile strength be 480 kg/cm$^2$ or more as measured according to JIS X-6301 by autograph.

[Impact strength]: According to JIS X-6301, the card was placed on a firm, horizontal plane; a steel ball was dropped onto the card from a height of 30 cm; and the card was visually checked for cracking and crazing.

[Flex temperature]: It is necessary that the flex temperature be 52° C. or more as measured according to JIS X-6301 using a hot-air dryer.

[Lamination properties]: According to JIS X-6301, the card was dipped in liquid paraffin at 150° C. for 5 minutes, and checked for occurrence of gaps between the layers.

[Heat resistance]: According to JIS X-6301, the card was dipped in water at 60° C. for 5 minutes, and visually checked for change on the surface.

[Resistance to thermal expansion and contraction]: According to JIS X-6301, the card was left to stand at −10° C. or +45° C. for 30 minutes, allowed to return to room temperature, and left to stand for 2 hours. It is necessary that the expansion/contraction ratio of the card be 2% or less.

[Blocking resistance]: According to JIS X-6301, the card was compressed at a pressure of 50 g/cm$^2$ in an atmosphere of 40° C. and 90% RH for 48 hours, and visually checked for change in appearance.

[Chemical resistance]: According to JIS X-6301, the card was dipped in a 5% salt water, a 1% aqueous solution of sodium carbonate, or a 5% aqueous solution of acetic acid for 24 hours, and visually checked for peeling.

[Humidity resistance]: According to JIS X-6301, the card was left to stand in an atmosphere of 40° C. and 90% RH for 48 hours, and visually checked for change in appearance.

[Height of embossed characters]: The card was rated as A when characters embossed thereon had a height between 430 to 480 μm relative to the surrounding surface of the card, and as B when the height of the embossed characters was outside the range.

[Biodegradability]: A biodegradable card base were cut into pieces (85.5×54 mm), and dipped at 25° C. in return sludge collected and treated in a water purification center (in Konan Chubu Office of Shiga Sewage Corporation). The weight loss of the card base was determined.

EXAMPLE 1B

Biodegradable Card Base of Four-layer Structure (B1)/(A1)/(A1)/(B1)

Production of core layer (A1)

A composition was prepared by blending 49 wt. % of a 3-hydroxybutylate/3-hydroxyvarerate copolymer (3-hydroxyvalerate content: 8 mol %); 49 wt. % of a polylactic acid with a number average molecular weight Mn of 200,000 obtained by ring-opening polymerization of L-lactic acid lactide; and 2 wt. % of TiO$_2$. The composition was melted and kneaded in a T-die extruder set at a cylinder temperature of 190° C. and a die temperature of 190° C., extruded on a cooling roll at a surface temperature of about 60° C., giving 280 μm thick sheets. The obtained sheets were used as the core layers (A1).

Production of overlay layer (B1)

A composition was prepared by blending 79.96 wt. % of a polylactic acid with a number average molecular weight Mn of 200,000 obtained by ring-opening polymerization of L-lactic acid lactide; 20 wt. % of a polycaprolactone with a Vicat softening temperature of 104° C. and a number average molecular weight Mn of 80,000; and 0.04 wt. % of a blue pigment. The composition was melted and kneaded in a T-die extruder set at a cylinder temperature of 210° C. and a die temperature of 200° C., and extruded on a cooling roll at a surface temperature of about 40° C., giving 100 μm thick sheets. The obtained sheets were used as the overlay layers (B1).

Production of biodegradable card base

Images were printed on two of the above obtained core layers (A1), using a silk screen printer. One of the overlay layers (B1) was superimposed on the printed side of one core layer (A1), and another overlay layer (B1) on the printed side of the other core layer (A1).

Thereafter, the two (A1)/(B1) structures were arranged so that the two non-printed sides of the core layers (A1) faced to each other, giving an unbonded biodegradable card base with a four-layer sandwich structure (B1)/(A1)/(A1)/(B1).

The unbonded biodegradable card base was held between two metal mirror plates and heated to 165° C. in 20 minutes, compressed at a pressure of 5 kg/cm$^2$ at 170° C. for 5 minutes, and then cooled to 40° C. in 20 minutes. Thus, a biodegradable card base was obtained which had a thickness of 760 μm [(B1)/(A1)/(A1)/(B1)=100 μm/280 μm/280 μm/100 μm].

Evaluation of biodegradable card base

A card was obtained by cutting the above card base having the four-layer structure (B1)/(A1)/(A1)/(B1). Characters were embossed on the card using a thin plate holding characters raised from the surface. The embossed characters did not crack or craze, and the card did not warp.

The card base, core layers (A1) and overlay layers (B1) were separately dipped in the return sludge described above at 25° C. to determine the weight loss. The weight loss was about 5% in 8 months in the case of the layered card base; about 63% in 6 month in the case of the core layers (A1) alone; and about 9% in 8 months in the case of the overlay layers (B1) alone.

The card base was tested for tensile strength, impact strength, lamination properties, heat resistance, resistance to thermal expansion and contraction, chemical resistance, blocking resistance, humidity resistance, height of the embossed characters and occurrence of warp after embossment. The results are shown in Table 2.

TABLE 2

|  | Ex. 1B | Ex. 2B | Ex. 3B | Comp. Ex. 1B |
| --- | --- | --- | --- | --- |
| Tensile strength (kg/cm$^2$) | 545 | 539 | 495 | 285 |
| Impact strength | No cracking or crazing | No cracking or crazing | No cracking or crazing | Crazing |
| Flex temperature | 52° C.≦ | 52° C.≦ | 52° C.≦ | 52° C.≦ |
| Lamination properties | No gaps between layers | No gaps between layers | No gaps between layers | — |
| Heat resistance | No change | No change | No change | No change |
| Resistance to thermal expansion and contraction |  |  |  |  |
| −10° C. | 0% | 0% | 0% | 0% |
| +45° C. | 0% | 0% | 0% | 0% |
| Chemical resistance |  |  |  |  |
| 5% salt water | No peeling | No peeling | No peeling | — |
| 5% aqueous solution of acetic acid | No peeling | No peeling | No peeling | — |

TABLE 2-continued

|  | Ex. 1B | Ex. 2B | Ex. 3B | Comp. Ex. 1B |
| --- | --- | --- | --- | --- |
| 1% aqueous solution of sodium carbonate | No peeling | No peeling | No peeling | — |
| Blocking resistance | No blocking | No blocking | No blocking | No blocking |
| Humidity resistance | No change | No change | No change | No change |
| Height of embossed characters | A | A | A | B |
| Occurrence of warp | No | No | No | Yes |

EXAMPLE 2B

Biodegradable Card Base of Three-layer Structure (B1)/(A1)/(B1)

Production of core layer (A1)

A composition was prepared by blending 49 wt. % of a 3-hydroxybutyrate/3-hydroxyvalerate copolymer (3-hydroxyvalerate content: 8 mol %); 49 wt. % of a polylactic acid with a number average molecular weight Mn of 200,000 obtained by direct dehydrating polycondensation of L-lactic acid and glycolic acid; and 2 wt. % of $TiO_2$. The composition was melted and kneaded in a T-die extruder set at a cylinder temperature of 190° C. and a die temperature of 190° C., and extruded on a cooling roll at a surface temperature of about 60° C., giving a 560 µm thick sheets. The obtained sheets were used as the core layer (A1).

Production of overlay layer (B1)

A composition was prepared by blending 79.96 wt. % of a polylactic acid with a number average molecular weight Mn of 200,000 obtained by direct dehydrating polycondensation of L-lactic acid lactide and a glycol; 20 wt. % of a polycaprolactone with a Vicat softening temperature of 104° C. and a number average molecular weight Mn of 80,000; and 0.04 wt. % of a blue pigment. The composition was melted and kneaded in a T-die extruder set at a cylinder temperature of 210° C. and a die temperature of 200° C., and extruded on a cooling roll at a surface temperature of about 40° C., giving 100 µm thick sheets. The obtained sheets were used as the overlay layers (B1).

Production of biodegradable card base

Patterns were printed on at least one side of the above obtained core layer (A1) using an offset printer. The printed he core layer (A1) was sandwiched between two overlay layers (B1), giving an unbonded biodegradable card base having a three-layer structure (B1)/(A1)/(B1).

The unbonded biodegradable card base was held between two metal mirror plates, compressed, heated and cooled in the same manner as in Example 1B, giving a biodegradable card base having a thickness of 760 µm [(B1)/(A1)/(B1)= 100 µm/560 µm/100 µm].

Evaluation of biodegradable card base

A card was obtained by cutting the above card base having the three-layer structure, and characters were embossed on the surface of the card. The embossed characters did not crack or craze, and the cards did not warp.

The biodegradable card base was dipped return sludge in the same manner as in Example 1B. Although no weight loss was confirmed after 28 days, it is presumed that the weight loss would have gradually increased if the card base was dipped for a prolonged period, as seen from the results of Example 1B.

The biodegradable card base was tested for tensile strength, impact strength, lamination properties, heat resistance, resistance to thermal expansion and contraction, chemical resistance, blocking resistance, humidity resistance, height of the embossed characters and occurrence of warp after embossment. The results are shown in Table 2.

EXAMPLE 3B

A biodegradable card base having a thickness of 760 µm [(B1)/(A1)/(B1)=100 µm/560 µm/100 µm] was prepared by following the procedure of Example 2B with the exception of using a composition obtained by blending 50 wt. % of a 3-hydroxybutyrate/3-hydroxyvalerate copolymer (3-hydroxyvalerate content: 8 mol %); 32 wt. % of a polylactic acid with a number average molecular weight Mn of 200,000 obtained by ring-opening polymerization of L-lactic acid lactide; 16 wt. % of a polycaprolactone with an average molecular weight Mn of 80,000; and 2 wt. % of $TiO_2$. A card was obtained by cutting the card base, and characters were embossed on the surface of the card in the same manner as in Example 1B. The embossed characters did not crack or craze, and the card did not warp.

The biodegradable card base was dipped in return sludge in the same manner as in Example 1B. Although no weight loss was confirmed after 28 days, it is presumed that the weight loss would have gradually increased if the card base was dipped for a prolonged period, as seen from the results of Example 1B.

The biodegradable card base was tested for tensile strength, impact strength, lamination properties, heat resistance, resistance to thermal expansion and contraction, chemical resistance, blocking resistance, humidity resistance, height of the embossed characters and occurrence of warp after embossment. The results are shown in Table 2.

COMPARATIVE EXAMPLE 1B

A composition was prepared by blending 80 wt. % of a 3-hydroxybutyrate/3-hydroxyvalerate copolymer (3-hydroxyvalerate content: 8 mol %); and 20 wt. % of a polycaprolactone with a Vicat softening temperature of 104° C. and an average molecular weight Mn of 80,000. The composition was melted and kneaded in a T-die extruder set at a die temperature of 170° C. and extruded on a cooling roll at a surface temperature of about 60° C., giving a 760 µm thick biodegradable card base. A card was obtained by cutting the card base, and characters were embossed on the surface of the card in the same manner as in Example 18. The embossed characters had a height of 300 µm or less relative to the surrounding surface.

Accordingly, when the card was used to produce impression on a sale slip with, for example, an imprinter, the resulting impression was unclear.

The card base was tested for tensile strength, impact resistance, lamination properties, heat resistance, resistance to thermal expansion and contraction, chemical resistance, blocking resistance, humidity resistance, height of the embossed characters, and occurrence of warp after embossment. The results are shown in Table 2.

EXAMPLE 1C

Biodegradable Card Base for ID Card Having Four-layer Structure (B2)/(A2)/(A2)/(B2)

A composition was prepared by blending 40 wt. % of a 3-hydroxybutyrate/3-hydroxyvalerate copolymer (3-hydroxyvalerate content: 8 mol %); 32 wt. % of a polylactic acid with a number average molecular weight Mn of 200,000 obtained by ring-opening polymerization of L-lactic acid lactide; 16 wt. % of a polybutylene succinate (PBS) with a number average molecular weight Mn of 85,000 obtained by subjecting succinic acid and 1,4-butanediol to dehydrating polycondensation and imparting a high molecular weight to the reaction product using a coupling agent; 8 wt. % of talc; and 4 wt. % of $TiO_2$. The composition was melted and kneaded in a T-die extruder set at a cylinder temperature of 190° C. and a die temperature of 190° C., and extruded on a cooling roll at a surface temperature of 60° C., giving 280 μm thick sheets. The sheets were used as the core layers (A2).

Then, a composition was prepared by blending 80 wt. % of a polylactic acid with a number average molecular weight Mn of 200,000 obtained by ring-opening polymerization of L-lactic acid lactide; 15 wt. % of polybutylene succinate (PBS) with a number average molecular weight Mn of 85,000 obtained by subjecting succinic acid and 1,4-butanediol to dehydrating polycondensation and imparting a high molecular weight to the reaction product using a coupling agent; and 5 wt. % of polybutylene succinate.adipate (PBSA) obtained by subjecting succinic acid, acipic acid and 1,4-butanediol to dehydrating polycondensation and imparting a high molecular weight to the reaction product using a coupling agent. The composition was melted and kneaded in a T-die extruder set at a cylinder temperature of 210° C. and a die temperature of 200° C., and extruded on a cooling roll at a surface temperature of about 50° C., giving 100 μm thick sheets. The obtained sheets were used as the overlay layers (B2).

Images and characters were printed on the surface of two core layers (A2) using a silk screen printer. One overlay layer (B2) was superimposed on the printed side of one core layer (A2), and another overlay layer (B2) on the printed side of the other core layer (A2).

Thereafter, the two (A2)/(B2) structures were arranged so that the non-printed sides of the core layers (A2) faced to each other, giving an unbonded biodegradable card base having a four-layer sandwich structure (B2)/(A2)/(A2)/(B2).

The unbonded biodegradable card base was held between two metal mirror plates, heated to 165° C. in 20 minutes, compressed at a pressure 5 kg/cm² at the same temperature for 5 minutes, and cooled to 40° C. in 20 minutes, giving a biodegradable card base having a thickness of 760 μm [(B2)/(A2)/(A2)/(B2)=100 μm/280 μm/280 μm/100 μm].

A card was obtained by cutting the above card base. A photograph and characters for identification were thermally transferred to the surface of one overlay layer (B2) using a hot stamp and color films (ribbons) having hot-melt ink layers. The color films were then removed, giving an ID card (85.5×54 mm) having color print of a photograph and characters for identification. The ID card was tested for properties necessary for cards, i.e., tensile strength, impact strength, lamination properties, heat resistance, resistance to thermal expansion and contraction, chemical resistance, blocking resistance and humidity resistance. The results of the tests and distinctiveness of the printed images and characters are shown in Table 3.

The biodegradable card base was dipped at 25° C. in the return sludge described above. Although no weight loss was confirmed after 28 days, it is presumed that the weight loss would have gradually increased if the card base was dipped for a prolonged period.

TABLE 3

| | Ex. 1C | Ex. 2C | Ex. 3C | Ex. 4C | Comp. Ex. 1C |
|---|---|---|---|---|---|
| Tensile strength (kg/cm²) | 502 | 495 | 498 | 508 | 521 |
| Impact strength | No cracking or crazing | No cracking or crazing | No cracking or crazing | No cracking or crazing | No cracking or crazing |
| Flex temperature | 52° C.≦ | 52° C.≦ | 52° C.≦ | 52° C.≦ | 52° C.≦ |
| Lamination properties | No gaps between layers | No gaps between layers | No gaps between layers | No gaps between layers | No gaps between layers |
| Heat resistance | No change | No change | No change | No change | No change |
| Resistance to thermal expansion and contraction | | | | | |
| −10° C. | 0% | 0% | 0% | 0% | 0% |
| +45° C. | 0% | 0% | 0% | 0% | 0% |
| Chemical resistance | | | | | |
| 5% salt water | No peeling | No peeling | No peeling | No peeling | No peeling |
| 5% aqueous solution of acetic acid | No peeling | No peeling | No peeling | No peeling | No peeling |
| 1% aqueous solution of sodium carbonate | No peeling | No peeling | No peeling | No peeling | No peeling |
| Blocking resistance | No blocking | No blocking | No blocking | No blocking | No blocking |
| Humidity resistance | No change | No change | No change | No change | No change |
| Distinctiveness of thermally transferred images and characters | Good | Good | Good | Good | Poor |

EXAMPLE 2C

An ID card was prepared by following the procedure of Example 1C with the exception of using, as overlay layers (B2), sheets prepared from a composition containing 80 wt. % of a polylactic acid with a number average molecular weight Mn of 200,000 obtained by ring-opening polymerization of L-lactide; 20 wt. % of the same polybutylene succinate (PBS) with a number average molecular weight Mn of 85,000 as used above; and 0.04 wt. parts of a blue pigment per 100 wt. parts of the polylactic acid and PBS combined. The obtained ID card had glossy, clear color print of a photograph and characters for identification.

The obtained card was tested for properties necessary for cards, i.e., tensile strength, lamination properties, heat resistance, resistance to thermal expansion and contraction, chemical resistance, blocking resistance and humidity resistance. The results of the tests and distinctiveness of the printed photograph and characters are shown in Table 3.

The card was dipped at 25° C. in the return sludge described above. Although no weight loss was confirmed after 28 days, it is presumed that the weight loss would have increased gradually if the card was dipped for a prolonged period.

EXAMPLE 3C

An ID card was prepared by following the procedure of Example 1C with the exception of using, as the overlay layers (B2), sheets prepared from a composition containing 80 wt. % of a polylactic acid with a number average molecular weight Mn of 200,000 obtained by ring-opening polymerization of L-lactide; 20 wt. % of the same polybutylene succinate.adipate (PBSA) with a number average molecular weight Mn of 92,000 as used above; and 0.04 wt. parts of a blue pigment per 100 wt. parts of the polylactic acid and PBSA combined. The obtained ID card bore glossy, clear color print of a photograph and characters for identification.

The obtained card was tested for properties necessary for cards, i.e., tensile strength, impact strength, lamination properties, heat resistance, resistance to thermal expansion and contraction, chemical resistance, blocking resistance and humidity resistance. The results of the tests and distinctiveness of the printed photograph and characters are shown in Table 3.

The card was dipped at 25° C. in the return sludge described above. Although no weight loss was confirmed after 28 days, it is presumed that the weight loss would have increased gradually if the card was dipped for a prolonged period.

EXAMPLE 4C

An ID card was prepared by following the procedure of Example 1C with the exception of using, as overlay layers (B2), sheets prepared from a composition containing 80 wt. % of a polylactic acid with a number average molecular weight Mn of 200,000 obtained by ring-opening polymerization of L-lactide; 5 wt. % of the same polybutylene succinate (PBS) with a number average molecular weight Mn of 85,000 as used above; and 15 wt. % of a polycaprolactone with a Vicat softening temperature of 104° C. The obtained ID card had glossy, clear color print of a photograph and characters for identification.

The obtained card was tested for properties necessary for cards, i.e., tensile strength, impact strength, lamination properties, heat resistance, resistance to thermal expansion and contraction, chemical resistance, blocking resistance and humidity resistance. The results of the tests and distinctiveness of the photograph and characters are shown in Table 3.

The card was dipped at 25° C. in the return sludge described above. Although no weight loss was confirmed after 28 days, it is presumed that the weight loss would have increased gradually if the card was dipped for a prolonged period.

COMPARATIVE EXAMPLE 1C

An ID card having color print of a photograph and characters for identification was prepared by following the procedure of Example 1C with the exception of using, as overlay layers (B2), sheets prepared from a composition containing 80 wt. % of a polylactic acid with a number average molecular weight Mn of 200,000 obtained by ring-opening polymerization of L-lactide; and 20 wt. % of a polycaprolactone with a Vicat softening temperature of 104° C.

The obtained card was tested for properties necessary for cards, i.e., tensile strength, impact strength, lamination properties, heat resistance, resistance to thermal expansion and contraction, chemical resistance, blocking resistance and humidity resistance. The results of the tests and distinctiveness of the printed photograph and characters are shown in Table 3.

The card was dipped at 25° C. in the return sludge described above. Although no weight loss was confirmed after 28 days, it is presumed that the weight loss would have increased gradually if the card was dipped for a prolonged period.

Table 3 reveals that biodegradable cards formed from the card bases of Examples 1 to 4 containing a high-molecular aliphatic polyester are excellent in properties necessary for cards, and improved in adhesion between the layers. Moreover, it is possible to provide glossy, clear color print of photographs and characters on the cards, for example, by thermally transferring photographs and characters using a hot stamp and color films. Further, such cards are biodegradable.

In contrast, the card base of Comparative Example 1C, although being excellent in properties as a card and biodegradability, is inferior in capability of receiving hot-stamped images or characters, failing to provide glossy, clear color print of photographs and characters. Therefore, such card base is not suitable for preparing cards having color print thereon.

What is claimed is:

1. A biodegradable single-layer card base comprising a composition a composition comprising 86 to 31 wt. % of a copolymer of 3-hydroxybutyrate and 3-hydroxyvalerate, 9 to 46 wt. % of a lactic acid polymer and 5 to 23 wt. % of a polycaprolactone.

2. A biodegradable card base comprising at least one core layer (A1) comprising a composition comprising 90 to 40 wt. % of a copolymer of 3-hydroxybutyrate and 3-hydroxyvalerate and 10 to 16 wt. % of a lactic acid polymer; and overlay layers (B1) comprising a composition comprising 95 to 60 wt. % or a lactic acid polymer and 5 to 40 wt. % of a polycaprolactone; the core layer (A1) being sandwiched between the overlay layers (B1).

3. A biodegradable card base according to claim 2, wherein the core layers(s) (A1) and the overlay layers (B1) are laminated to form a three-layer structure (B1)/(A1)/(B1) or a four-layer structure (B1)/(A1)/(A1)/(B1).

4. A biodegradable card base according to claim 2, wherein the core layer(s) (A1) comprises a composition comprising 77 wt. % or more of the combined amount of a 3-hydroxybutyrate/3-hydroxyvalerate copolymer and a lactic acid, and 23 wt. % or less of a polycaprolactone.

5. A biodegradable card wherein the core layer(s) (A2) comprises a composition comprising 82 to 27 wt. % of a copolymer of 3-hydroxybutyrate and 3-hydroxyvalerate, 9 to 40 wt. % of a lactic acid polymer and 9 to 33 wt. % of a high-molecular weight aliphatic polyester having a number average molecular weight (Mn) of 10,000 or more obtained by dehydrating polycondensation of a glycol and an aliphatic dicarboxylic acid; and wherein the overlay layers (B2) comprising a composition comprising 99 to 67 wt. % of a lactic acid polymer and 1 to 33 wt. % of a high-molecular weight aliphatic polyester having a number average molecular weight (Mn) of 10,000 or more obtained by dehydrating polycondensation of a glycol and an aliphatic dicarboxylic acid.

6. A biodegradable card base according to claim 5, wherein the core layers(s) (A2) and the overlay layers (B2) are laminated to form a three-layer structure (B2)/(A2)/(B2) or a four-layer structure (B2)/(A2)/(A2)/(B2).

7. A biodegradable card base according to claim 5, wherein the overlay layers (B2) comprise a composition comprising 73 wt. % or more of the combined amount of a lactic acid polymer and a high-molecular weight aliphatic polyester having a number average molecular weight (Mn)

of 10,000 or more obtained by dehydrating polycondensation of a glycol and an aliphatic dicarboxylic acid, and 27 wt. % or less of a polycaprolactone.

8. A biodegradable card base according to claim 5, wherein the glycol in the high-molecular weight aliphatic polyester is at least one member selected from the group consisting of ethylene glycol, 1,4-butanediol, 1,6-hexanediol, decamethylene glycol, neopentyl glycol and 1,4-cyclohexane dimethanol.

9. A biodegradable card base according to claim 5, wherein the aliphatic dicarboxylic acid in the high-molecular weight aliphatic polyester is at least one member selected from the group consisting of succinic acid, adipic acid, suberic acid, sebasic acid, dodecanoic acid, succinic anhydride and adipic anhydride.

10. A biodegradable card base according to claim 5, wherein the high-molecular weight aliphatic polyester is a polymer or copolymer synthesized by dehydrating polycondensation of at least one glycol and at least one aliphatic dicarboxylic acid.

11. A biodegradable card base according to claim 5, wherein the high-molecular weight aliphatic polyester comprises, in addition to the at least one glycol and at least one aliphatic dicarboxylic acid, a third component which is at least one polyfunctional component selected from the group consisting of tri- or tetrafunctional polyhydric alcohols, oxycarboxylic acids, polycarboxylic acids and their anhydrides.

12. A biodegradable card base according to claim 5, wherein the high-molecular weight aliphatic polyester is at least one member selected from the group consisting of polyethylene succinate, polybutylene succinate and polybutylene succinate.adipate.

13. A biodegradable card base according to claim 5, wherein color photographs and/or characters can be printed on the surface of the overlay layers (B2) by thermally transferring photographs and/or characters using a hot stamp and a color film having a hot-melt ink layer and/or a heat-sublimable ink layer, and removing the color film.

14. A biodegradable card base according to claims 1, 2 or 5, wherein the copolymer of 3-hydroxybutyrate and 3-hydroxyvalerate contains 1 to 20 mol % of 3-hydroxyvalerate.

15. A biodegradable card base according to claims 1, 2 or 5, wherein the lactic acid polymer is a polymer obtained by direct dehydrating condensation of any one of L-lactic acid, D-lactic acid and D,L-lactic acid.

16. A biodegradable card base according to claims 1, 2 or 5, wherein the lactic acid polymer is a copolymer obtained by direct dehydrating polycondensation of hydrocarboxylic acid and any one of L-lactic acid, D-lactic acid and D-L-lactic acid.

17. A biodegradable card base according to claims 2 or 5 wherein the lactic acid polymer is a polymer obtained by ring-opening polymerization of a lactide of any one of L-lactic acid, D-lactic acid and D,L-lactic acid.

* * * * *